US006967962B1

(12) United States Patent
Medina et al.

(10) Patent No.: US 6,967,962 B1
(45) Date of Patent: Nov. 22, 2005

(54) LINKING CROSSBAR CONTROLLER

(75) Inventors: Eitan Medina, Tel-Aviv (IL); David Shemla, Kfar Havradim (IL)

(73) Assignee: Marvell Semiconductor Israel Ltd., Yokneam (IL)

(*) Notice: Subject to any disclaimer, the term of this patent is extended or adjusted under 35 U.S.C. 154(b) by 0 days.

(21) Appl. No.: 09/348,865

(22) Filed: Jul. 7, 1999

Related U.S. Application Data

(60) Provisional application No. 60/125,273, filed on Mar. 19, 1999.

(30) Foreign Application Priority Data

Jul. 8, 1998 (IL) ................................................. 125273

(51) Int. Cl.[7] ........................ H04L 12/28; H04L 12/56; H04L 12/54
(52) U.S. Cl. ........................ 370/413; 370/416; 370/428
(58) Field of Search ............................... 370/400–402, 370/447, 461–462, 236, 412–418, 380, 465, 326, 345, 252, 230, 375, 369, 359, 419, 428; 375/222

(56) References Cited

U.S. PATENT DOCUMENTS

| | | | | | |
|---|---|---|---|---|---|
| 4,922,348 A | * | 5/1990 | Gillon et al. | ................ | 358/407 |
| 5,179,669 A | * | 1/1993 | Peters | ........................ | 710/317 |
| 5,923,660 A | * | 7/1999 | Shemla et al. | ............... | 370/402 |
| 6,032,205 A | * | 2/2000 | Ogimoto et al. | .............. | 710/33 |
| 6,157,967 A | * | 12/2000 | Horst et al. | .................... | 710/19 |
| 6,192,422 B1 | * | 2/2001 | Daines et al. | ................. | 710/29 |
| 6,205,542 B1 | * | 3/2001 | Grochowski et al. | ....... | 712/219 |
| 6,226,292 B1 | * | 5/2001 | DiPlacido | ................ | 370/395.7 |
| 6,314,501 B1 | * | 11/2001 | Gulick et al. | ............... | 711/153 |
| 6,353,618 B1 | * | 3/2002 | Hung et al. | ................. | 370/459 |
| 6,370,148 B1 | * | 4/2002 | Calvignac et al. | .......... | 370/412 |
| 6,388,993 B1 | * | 5/2002 | Shin et al. | ................... | 370/233 |
| 6,614,796 B1 | * | 9/2003 | Black et al. | ................ | 370/403 |

OTHER PUBLICATIONS

Newton, Newton's Telecom Dictionary, Oct. 1998, Telecom Books, p. 234.*
Newton, Newton's Telecom Dictionary, U.S. Telecom Books, 1998, p. 197.*

* cited by examiner

*Primary Examiner*—Chi Pham
*Assistant Examiner*—Ronald Abelson

(57) ABSTRACT

A data network including at least one crossbar, wherein each crossbar comprises N ports and a plurality N of devices each associated with and connected to one port of one of the crossbars. Each one port of one crossbar includes an input buffer, a plurality N−1 of port output buffers, a plurality N−1 of fullness sensors, shutoff devices. The input buffer receives messages from the device connected to its port and sends the messages to the other ports of the one crossbar. Each port output buffers corresponds to one of the other ports, wherein each port output buffer receives the messages only from the input buffer of its associated other port. Each fullness sensor is associated with one port output buffer and measures the fullness state of its associated port output buffer.

27 Claims, 9 Drawing Sheets

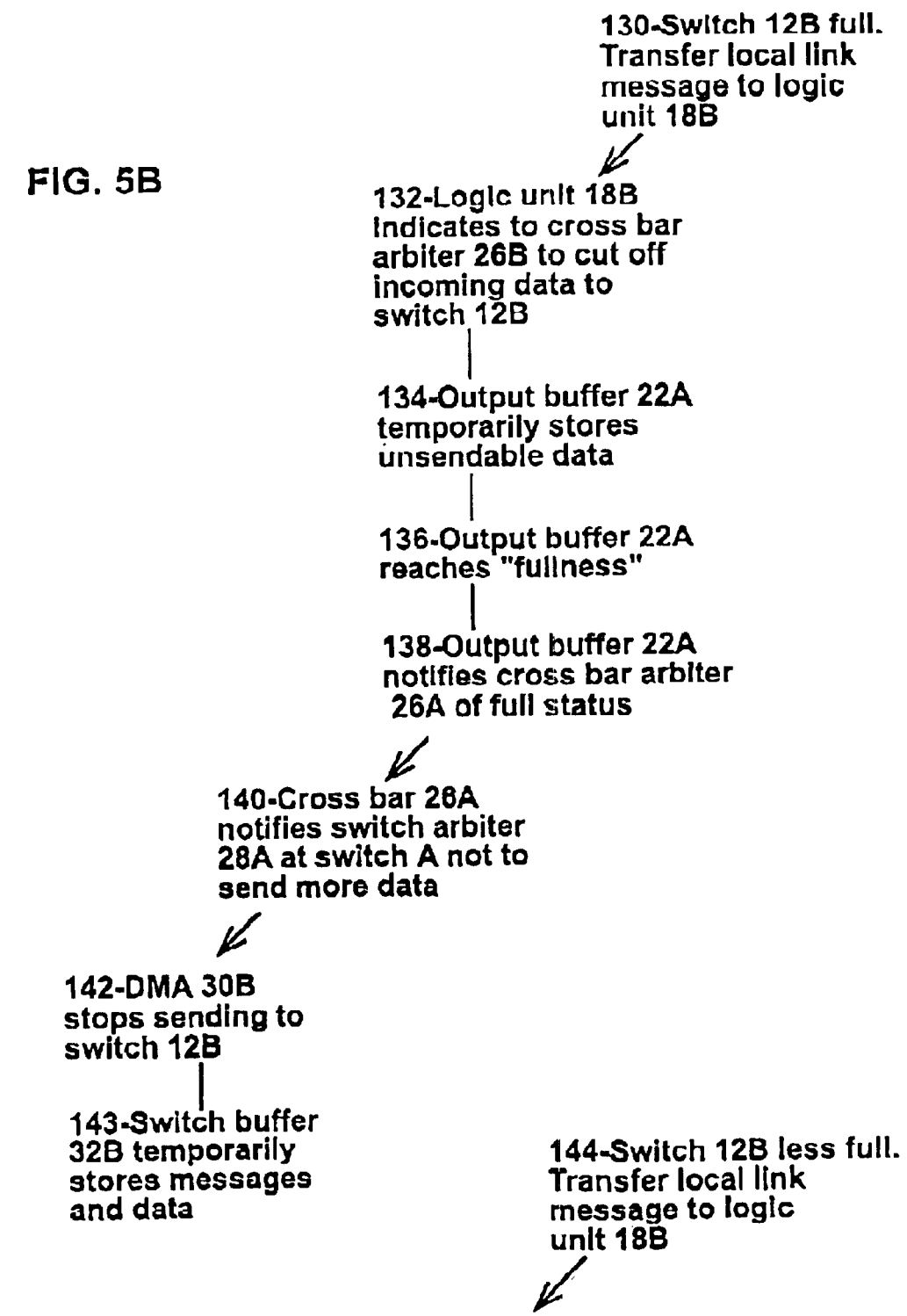

| Source Network Switch 12A | Port 16A on Cross Bar 10 | 16B on Cross Bar 10 | Destination Network Switch 12B |
|---|---|---|---|

146-Logic unit 18B indicates to cross bar arbiter 26B to reopen inflow to switch 12B 148-Output buffer 22A restarts transmission to switch 12B 150-Output buffer 22A reaches emptiness, notifies cross bar arbiter 26A 152-Cross bar arbiter 28A notifies switch arbiter 26A to resume transfer 154-Switch 12A indicates to DMA 30B to resume communication 156-Switch buffer 32B resumes sending data

FIG. 5B Continued

LINKING CROSSBAR CONTROLLER

This application claims the benefit of Provisional Application No. 60/125,273, filed Mar. 19, 1999.

FIELD OF THE INVENTION

The present invention relates to network switches generally and to cross-bars in particular.

BACKGROUND OF THE INVENTION

A network switch creates a network among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data which it receives from the units (end node or network switch) connected to it while the switch determines how, when and through which port to retransmit the packets. Each packet can be transmitted to only one destination address (a "unleast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory or written over.

Switching Ethernet Controllers (SECs) are network switches that implement the Ethernet switching protocol. According to the protocol, the Ethernet network (cabling and Ethernet ports) operates at 10 Megabits per second. Switches which operate at the desired speed of 10 Megabits per second are known as providing "full-wire" throughput.

In U.S. patent application Ser. No. 08/790,155, filed Jan. 28, 1997 now U.S. Pat. No. 5,923,660 which issued on Jul. 13, 1999, and incorporated herein by reference, in order to optimize through-put time, communication between SECs attempts to utilize the bus as little as possible so that the bus will be available as soon as a SEC wants to utilize it. Therefore, each SEC includes a write-only bus communication unit which transfers the packet out of the SEC by only writing to the bus. Thus, packets enter each SEC by having been written therein from other SECs and not by reading them in, since read operations utilize the bus for significant amounts of time compared to write operations. Having the bus available generally whenever a SEC needs it helps to provide the full-wire throughput.

However, when many SECs write to the same bus, the throughput is limited by the speed of the bus.

SUMMARY OF THE PRESENT INVENTION

It is an object of the present invention to provide a cross-bar for communicating between Switching Ethernet Controllers (SEC) and PCIs.

There is therefore provided in accordance with a preferred embodiment of the present invention a data network including at least one crossbar, wherein each crossbar comprises N ports and a plurality N of devices each associated with and connected to one port of one of said crossbars. Each one port of one crossbar includes an input buffer, a plurality N−1 of port output buffers, a plurality N−1 of fullness sensors, shutoff means.

The input buffer receives messages from the device connected to its port and sends said messages to the other ports of said one crossbar. Each port output buffers corresponds to one of said other ports, wherein each port output buffer receives said messages only from said input buffer of its associated other port. Each fullness sensor is associated with one port output buffer and measures the fullness state of its associated port output buffer.

The shutoff means connects to the fullness sensors associated with the port output buffers corresponding to said one port at said N−1 other ports, for, when said fullness state for one of said other ports is generally full, indicating to said device connected to said one port not to send data for the port which is now generally full.

There is therefore provided a network wherein each device additionally includes N−1 device output buffers, one per the N−1 other ports of said crossbar.

Additionally, there is therefore provided a network wherein each port comprises a bus link connected to said corresponding associated device.

Moreover, each device also includes a multiplicity of direct memory access (DMA) units for removing data from at least one of said device output buffers.

Furthermore, each crossbar in the network includes an arbiter for providing said messages from said N−1 port output buffers to said device connected to its port only if said device is not full.

There is therefore provided in accordance with a preferred embodiment of the present invention a switch for a data network, the data network including at least one crossbar having N ports and the switch being connectable to one of said N ports. The switch includes a multiplicity of switch output buffers, one per the N−1 other ports of said crossbar and at least two direct memory access (DMA) units, each associated with at least one of said switch output buffers, for removing data from said associated at least one switch output buffers.

BRIEF DESCRIPTION OF THE DRAWINGS

The present invention will be understood and appreciated more fully from the following detailed description taken in conjunction with the drawings in which:

FIG. 5B is a illustration of a local link communication in accordance with switching Ethernet controller network of FIG. 1;

DETAILED DESCRIPTION OF THE PRESENT INVENTION

Figure 1:
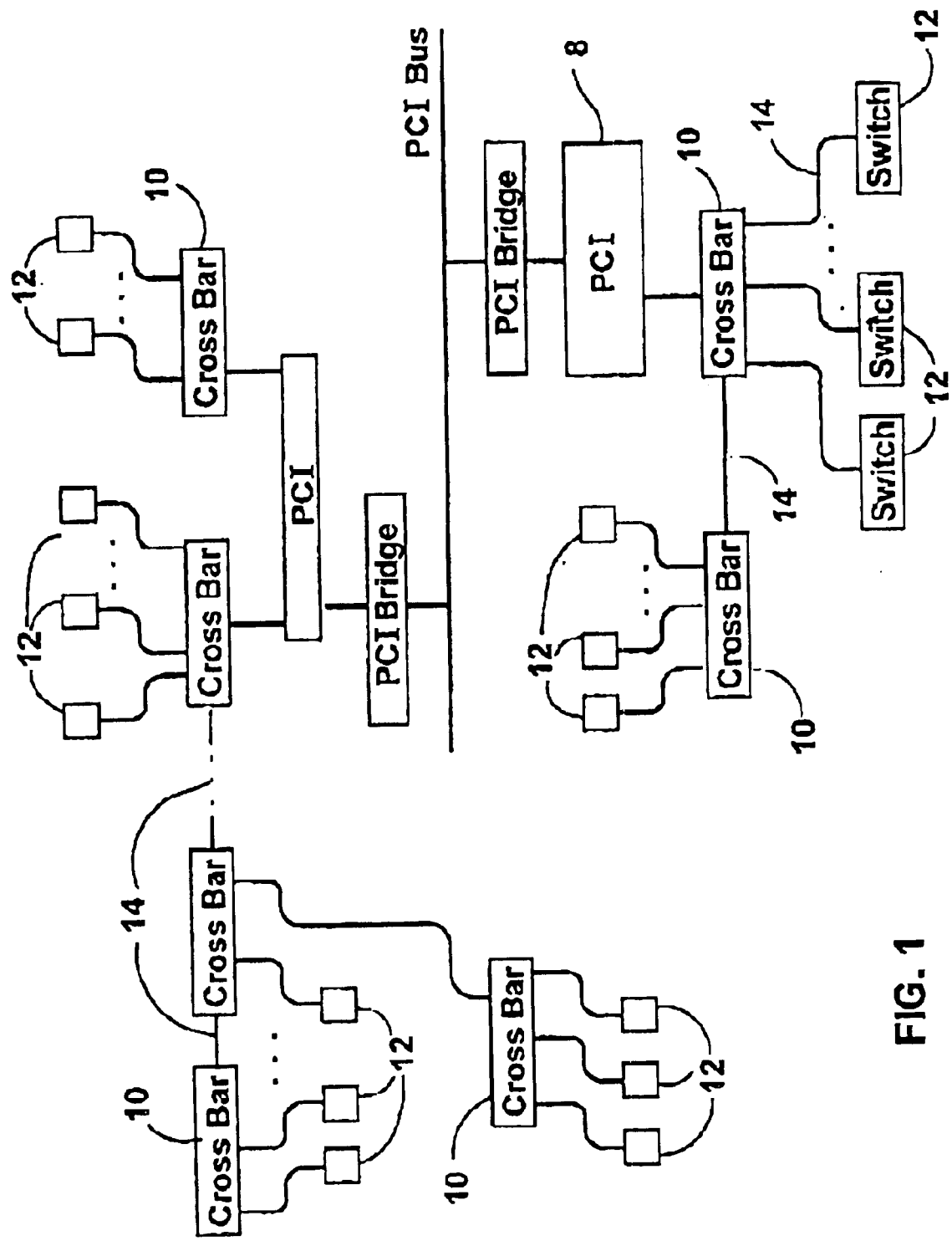
FIG. 1 is a block diagram illustration of a network of switching communication controllers, constructed and operative in accordance with a preferred embodiment of the present invention.

Reference is now made to FIGS. 1, 2, 3 and 4 which illustrate, in general terms, a cross bar 10 of the present invention and its connection within a network, wherein FIG. 1 illustrates a general overview of one or more cross bars 10 connected via one or more individual buses 14 to one or more Ethernet switches 12. Since each Ethernet switch 12 is connected to the cross-bar 10 via its own individual bus 14, the cross bar 10 typically provides linking operations, transferring data from switch to switch. The one or more Ethernet switches 12 are typically connected to one or more devices or work stations, not shown in the figures.

As further illustrated in FIG. 1, the network switches 12 interconnected to create a large network or to enlarge an exciting network. A plurality of network switches 12 are connected to PCI buses which are connected through PCI-to-PCI bridges. Thus, two bus networks can be connected together through the addition of another PCI bus and two PCI-to-PCI bridges.

Figure 2:
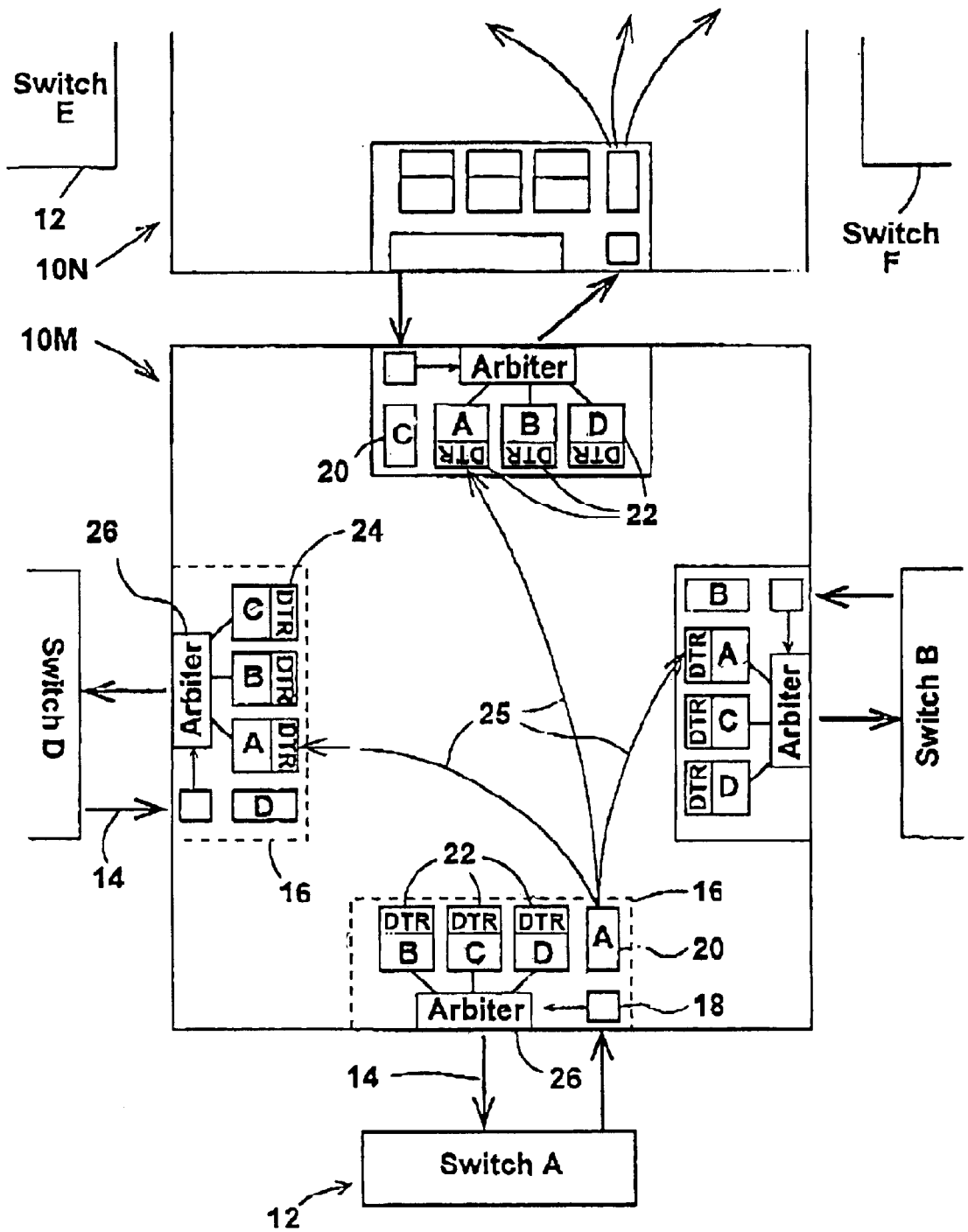
FIG. 2 is a schematic illustration of a switching communication cross bar controller forming part of the network of FIG. 1.
Figure 3:
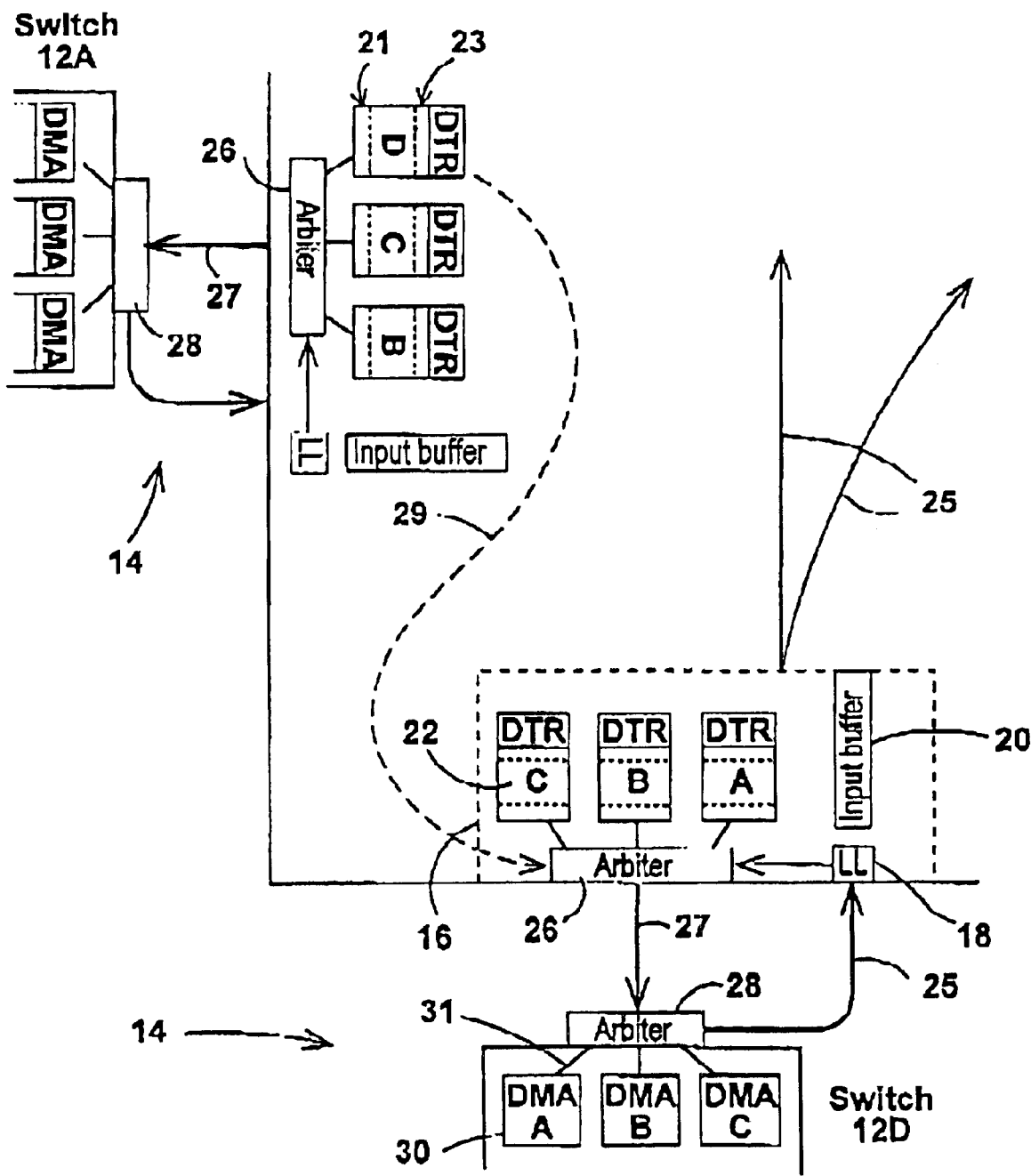
FIG. 3 is a schematic illustration of a portion of the cross bar of FIG. 2 and an Ethernet switching unit forming part of the switching network of FIG. 1.
Figure 4:
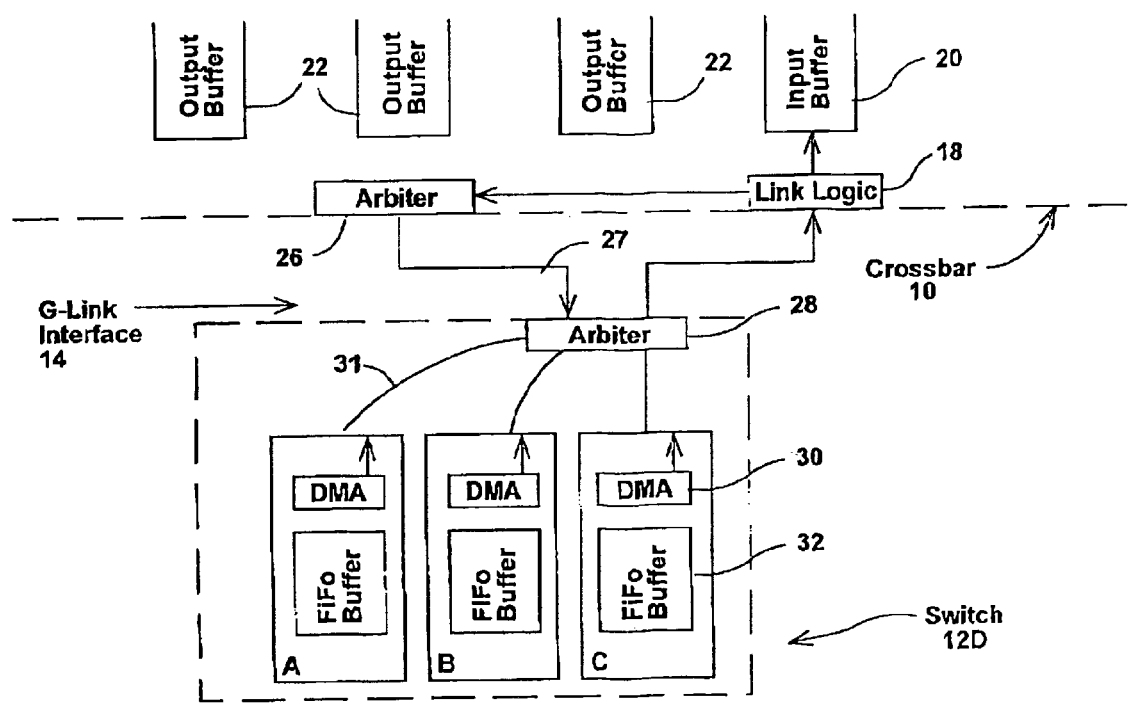
FIG. 4 is a schematic illustration of the switching unit and link connection forming part of the switching network of FIG. 1.

FIGS. 2, 3 and 4 illustrate the network of FIG. 1, and especially cross bar 10 and elements of the associated switches 12, in some detail. In order to facilitate understanding, switches 12, along with other similar type elements, have been alphabetized to indicate location or sequence in the network. This numbering is for explanation only. In addition, in order to facilitate understanding, arrows have been added to represent data packet flow; however, for clarity, not every data flow path has been mapped.

As shown in FIG. 2, cross bar 10 comprises a multiplicity of ports 16 which each port 16 comprises a link logic unit 18, an input FIFO buffer 20, a plurality of output buffers 22 and a port transmit arbiter 26. Typically cross bar 10 has four ports 16; however, it may comprise any number of ports 16.

Each port 16, and the elements which it comprises, are dedicated to an associated switch 12 or cross bar 10, and are responsible for all communication with its associated switch 12 or crossbar 10. As an example, the elements which comprise port 16A are associated with switch 12A and are responsible for switch 12A's communication: link logic unit 16A receives and directs messages and data from switch 12A, and performs various port functions which will be described in more detail hereinbelow; input FIFO buffer 20A receives and stores data packets sent from switch 12A; output buffers 22 at port 16A receive and store data packets sent to switch 12A; and, port transmit arbiter 26A sends messages and data to switch 12A.

Port to port communication is made via point-to-point connection between input buffers 20 and their associated output buffers 22. As an example, and as represented in FIG. 2 by solid lines 25, input buffer 20A is connected to output buffer 22A. Output buffers 22A are located at ports 16B, 16C and 16D, respectively.

Input buffer 20A transfers data packets via output buffers 22A to ports 16B, 16C and 16D. Additionally, though not represented in the Figures, input buffer 20B is connected to output buffers 22B, located at ports 16A, 16C and 16D, and so on. This point-to-point connection allows simultaneous non-collision data transfers from the input buffers 20 to their dedicated output buffers 22, and hence simultaneous communication between ports 16.

Communication starts at switch 12, which writes a link message and/or an accompanying data packet into its associated link logic unit 18. Link messages are either sent alone or interleaves with data packets. Two major types of link messages are possible; switch link message to be transferred to another switch, and local link messages indicating the status of the associated switch 12. Switch link messages transferred with an accompanying data packet contain information concerning the associated data packet.

Logic unit 18 reads the first bit of the link messages, which identifies the type of link messages being transmitted. As an example, if the first bit is set of 1, as an example, then logic unit 18 recognizes the message as a local link message, does not transfer the message, and proceeds to perform port functions which will be described in more detail hereinbelow. If the first bit is not set or is 0, then the logic unit 18 recognizes the link messages as being a switch link message and transfers the message and the associated packet to the input buffer 20.

As an example, switch 12A sends a link message and data packet to logic unit 18A; logic unit 18A identifies the link message as a switch link message and transfer both the switch link message and the data packet to input buffer 20A.

Via the direct point-to-point connections noted hereinabove, the input buffer 20 on port 16 transfers the link message and data packet to its associated output buffers 22 located on the other ports 16 on cross bar 10. As an example, input buffer 20A transfers the message and packet to output buffers 22A located on ports 16B, 16C and 16D.

Each port 16 is identified by a port address, and each device, connected to one of the switches, is identified by its own device address or number. Each output buffer 22 comprises a device table register 24, coupled thereto. When port 16 is linked to a switch 12, register 24 logically holds the device number of a device linked to that specific port 16. When port 16 is linked to a cross bar 10, register 24 logically holds the device numbers of all the devices connected to the cross bar 10 linked to that specific port 16.

The device number is also logically contained within the switch link message. When the switch link message and data packets are received at the port 16, the packet is first received by the device table register 24. If the device number data in the switch link message is included in the receiving register 24, the message and packet is written into the coupled output buffer 22; if the device number data in the switch link message is not included in the receiving register 24, then the register 24 simply ignores the message, and does not receive it.

As an example, the switch link message and its associated data packet of the previous example are intended for transfer to a device linked to port 16B. Output buffers 22A located on ports 16B, 16C and 16D receive the message and the packet. The registers 24A at ports 16C and 16D do not include the device number contained in the switch message, and thus ignore the message. The register 24A coupled to output buffer 22A at port 16B does not include the device number, and hence writes the message and packet into output buffer 22A at port 16B. Output buffer 22A at port 16B then transfers the message and packet to the port transmit arbiter 26B, which transfers the message and packet via link 14B to switch 12B, and onto its eventual destination.

It is common that some switches 12 and their dedicated ports 16 are busier than others. For example, if switch 12A is extremely busy, the memory in switch 12A may become too full to receive more data packets. In such a case, the present invention implements flow control which ensures that no data is lost during the temporary backup.

In this situation, if switch 12A is full, it notifies such to logic unit 18A. Logic unit 18A then signals to port transmit arbiter 26A to cut off the data flow via link 14A to switch 12A. As a result, switch 12A does not receive any more data packets, however, it does continue to send link messages and/or data packets to input buffer 20A. Once the memory in switch 12A is cleared, switch 12A sends a message to logic unit 18A to re-open up the link 14A and re-allow data packet transfer to the switch.

While the link 14A to switch 12A is closed, all data packets sent to switch 12A are temporarily stored in the output buffers 22B, 22C, and 22D, located at port 16A. If port 16A continues to be busy, the temporarily stored data messages may backup in one of the output buffers 22 at port 16A, as an example, output buffer 22D at port 16A (FIG. 3).

Each output buffer 22 comprises an almost full threshold 23, which when crossed, signifies that the output buffer 22 has become almost full and can not receive anymore data packets. Similarly, each output buffer 22 comprises an almost empty threshold 21, which when crossed, signifies that output buffer 22 has become almost empty and can again receive data packets.

In accordance with a preferred embodiment of the present invention, and as per the example from above, the data is output buffer 22D crosses almost full threshold 23. As indicated in FIG. 3 by dashed arrows 29, the almost full output buffer 22D (at port 16A) sends a message to the port transmit arbiter 26D (at port 16D). The message notifies port transmit arbiter 26D that switch 12 A is almost full and requests that port 16D stop sending data to switch 12A.

Referring now to FIG. 4, each port transmit arbiter 26 communicates with its associated switch 12, via link 14 and an associated switch arbiter 28. When port transmit arbiter 26 receives a signal to cut off outgoing data packets. It notifies such to switch arbiter 26, which partially halts the outward flow of data packets; when port transmit arbiter 28 receives a signal to reopen communication, it notifies such to switch arbiter 28, which then reopens outward flow.

As per the above example, port transmit arbiter 26D notifies switch arbiter 28D of switch 12D (arrow 27) to stop transferring data to switch 12A. Arbiter 28D stops transfer of data to switch 12A, however, still transfers data to other switches, as indicated by arrows 25.

When the temporarily stored data packets at output buffer 22D (at port 16A) have cleared-out, and have crossed the almost empty threshold 21, the output buffer 22D notifies sends a message to bar arbiter 26D (at port 10D) notifying it that switch 12 A is almost empty. Port transmit arbiter 26D resumes sending data packets to port 16A.

For the purpose of temporarily storing data packets while cross bar arbiter 26 has halted traffic, and as shown in FIG. 4, each switch 12 has a plurality of Direct Memory Access (DMA) units 30 and associated switch FIFO buffers 32. Each DMA 30 is responsible for transfer of data from its associated FIFO buffer 32.

When port transmit arbiter 26D notifies arbiter 28D of switch 12D to stop sending data packets to switch 12A, switch arbiter 28D so indicates to the DMA unit 30A, DMA unit 30A stops transferring data from FIFO buffer 32A to switch 12A. However, the remaining DMA units 30 remain active, sending data through port 16D to the other switches 12.

When the outgoing data traffic from switch 12 is closed, data packets intended for transfer are temporarily stored in switch buffers 32. As noted above, each DMA 30 is linked to an associated switch buffer 32. Additionally, each DMA 30 is dedicated to one or more different ports 16. Generally each DMA 30 is dedicated to 2 ports, as example ports 16A and 16D, however, DMA 30 could be dedicated to any number of ports depending on the switch's load.

When arbiter 28 receives a message to close off outflow of data from switch 12 to an almost full port 16, only the outflow from the DMA 30 associated with the "full" port 10 is cut off. The DMA's 30 associated with the other ports 16 remain active. Consequently, the only affected data flows are those of the associated ports and not the entire outgoing data flow from switch 12.

Hence, in contrast to prior art network systems which required a total data flow halt upon collision from backups, the flow control system of the present invention allows data flow to continue, and stems only that traffic affected by the backup.

Figure 5A:
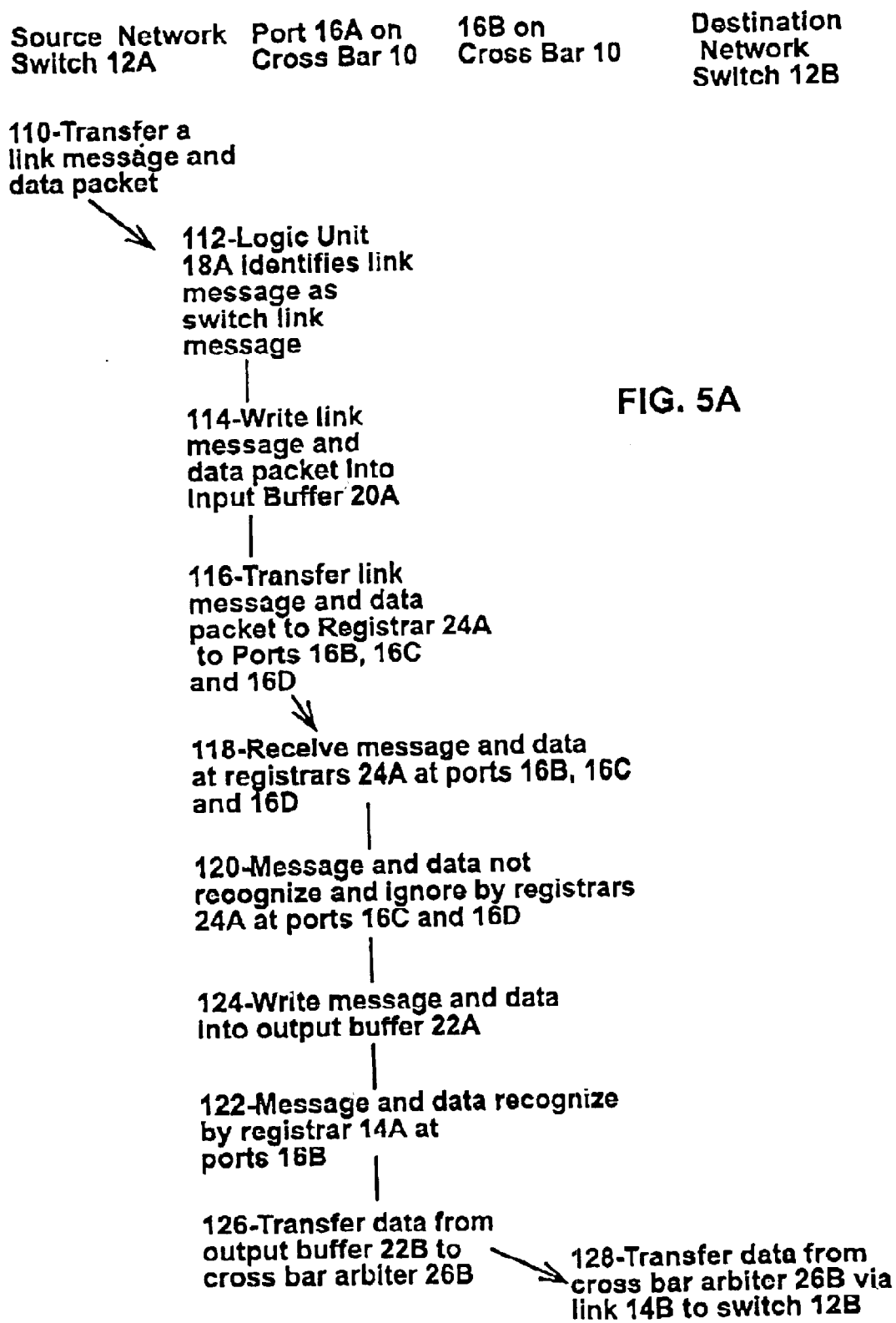
FIG. 5A is a flow chart illustration of the networking communication in accordance with a preferred embodiment of the present invention.

Reference is now made to FIGS. 5A and 5B illustrating the communication flow in the cross bar 10 among source switch 12A, port 16A on cross bar 10, port 16B on cross bar 10 and destination switch 12B, summarizing the flow discussed hereinabove.

Switch 12A transfers (step 110) a link message and a data packet to logic unit 18A. The logic unit 18A identifies (step 112) the link message as a switch link message and writes (step 114) the link message and data packet into input buffer 20A.

The input buffer 20A transfers (step 116) the link message and data packet to the registers 24A at ports 16B, 16C and 16D. The registers 24A at ports 16B, 16C and 16D receive (step 118) the link message and the data packet transferred from switch 12A. Registers 24A at ports 16C and 16D do not recognize (step 120) the device number in the link message and ignore the message and the data packet. The register 24A at port 16B, recognizes (step 122) the device number in the link message, and the link message and data packet are written (step 124) into the output buffer 22A at port 16B.

If switch 12B is not full, output buffer 22A at port 16B transfers (step 126) the data to port transmit arbiter 26B, which transfers (step 128) the message and data via link 14B to switch 12B.

If switch 12B becomes full, it transfers (step 130, FIG. 6B) a local link message to logic unit 18B indicating such. Logic unit 18B indicates (step 132) to port transmit arbiter 26B to step sending any messages and/or data to switch 12B. Output buffer 22A at port 16B fills up (step 134) with temporarily stored unsendable messages and data.

When output buffer 22A at port 16B reaches (step 136) almost fullness threshold 23, it notifies (step 138) such to port transmit another 26A at port 16A. Arbiter 26A notifies (step 140) switch arbiter 28A at switch 12A not to send anymore data to port 16B until further notice. Switch 12A indicates (step 142) to its DMA 30B (on switch 12A) to step sending to switch 12B, and switch buffer 32B (on switch 12A and dedicated to port 16B) temporarily stores (step 143) unsendable messages and data.

When switch 12B is capable of receiving again, it sends (step 144) a local link message to logic unit 16B indicating that it is now open to receive. Logic unit 16B indicates (step 146) to port transmit arbiter 26B to reopen inflow to switch 12B. Output buffer 22A at port 16B restarts transmission (step 148). When the output buffer 22A at port 16B reaches an empty threshold 21 (step 150) it notifies such to port transmit arbiter 26A at port 16A.

Port transmit arbiter 26A notifies (step 152) switch arbiter 26A at switch 12A to resume transfer of data to port 16B. Switch A indicates (step 154) to DMA 30B to resume sending data. Switch buffer 32B (on switch 12A and dedicated to port 16B) resumes (step 158) transfer of messages and data to switch 12B.

Figure 6:
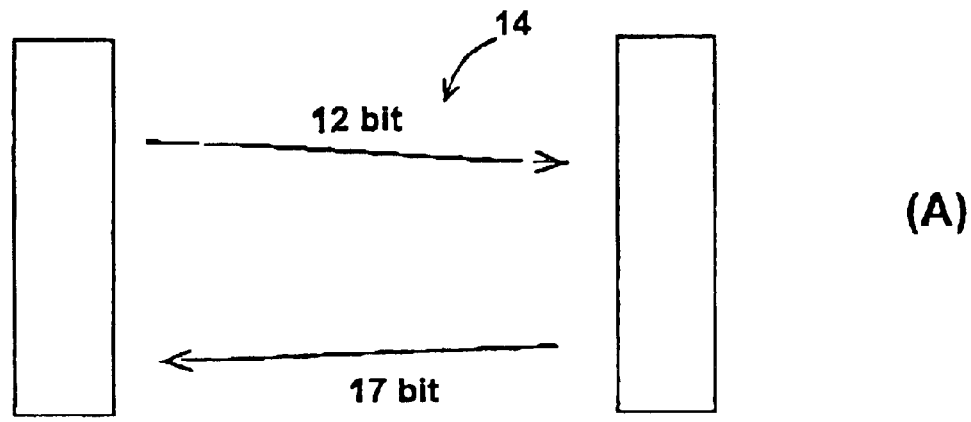
FIG. 6A is a schematic diagram of an interface bus.
FIG. 6B is a block illustration of a message architecture used in the interface bus of FIG. 6A.
FIG. 6C is a timing diagram illustration of the activity of the bus during the operations of FIG. 6A.
Figure 6:
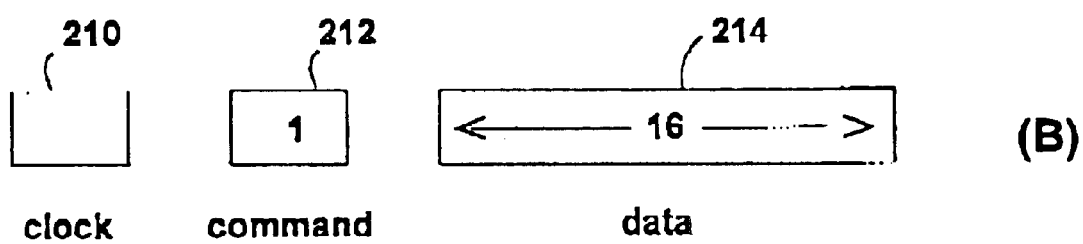
Figure 6:
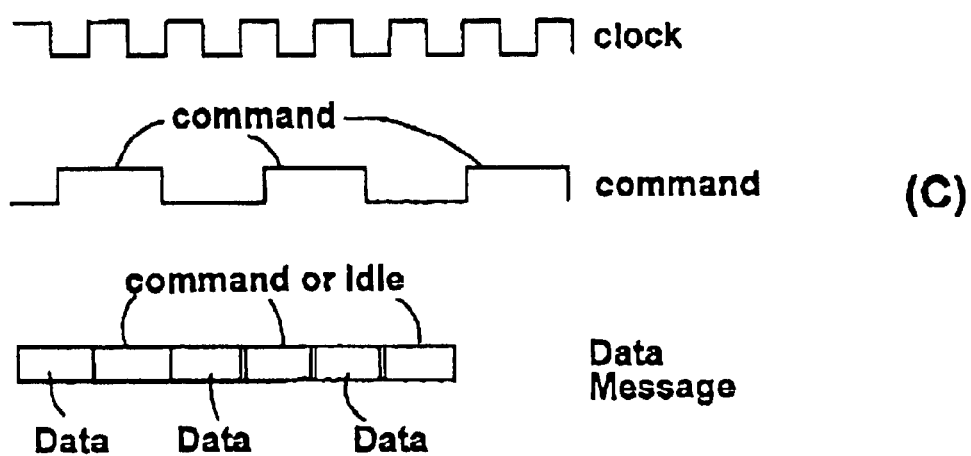

Reference is now made to FIGS. 6A, 6B, 6C and 7. FIGS. 6A, 6B and 6C describe a preferred embodiment of an interface bus used in the individual bus 14 of the present invention; FIG. 6A is schematic diagram of the interface bus, FIG. 6B is a message architecture used in the interface bus, and FIG. 6C is a timing diagram illustration of the activity of the bus during operations.

Figure 7:
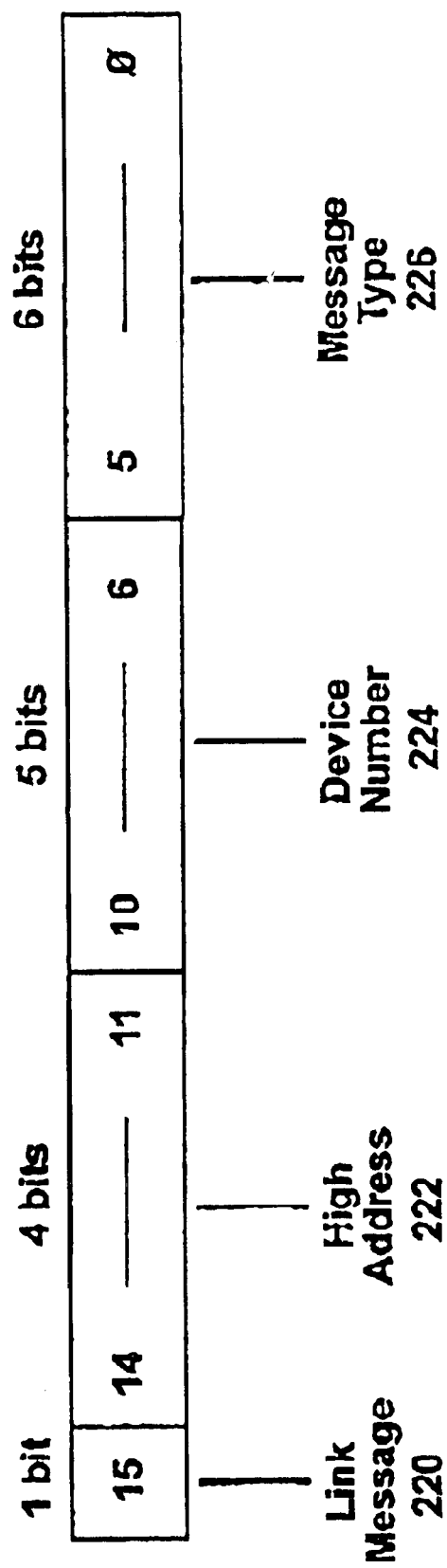
FIG. 7 is a block diagram illustration of the logical elements of a link message used in the present invention.

Individual bus 14 is a 17 bit, point-to-point bus and comprises a clock signal 210, a command bit signal 212 and 16 bits of data signal 214. The 10 bit data 214 transfers either a 16 bit link message or data packets. FIG. 7 is a block diagram illustration of the logical elements of data bits 214.

As noted hereinabove, each link 14 provides the connection and communication between one cross bar 10 and one switch 12, and transfers link messages and data packets therebetween. As additionally noted hereinabove, link messages 214 are transferred either alone or accompanied by data packets, and switch link messages transferred with data packets are used to communicate information about the associated data packet.

Clock 210 functions in a manner similar to network clocks known in the art, and as such will not be described in detail herein. Command bit 212 is a one cycle command word and data bits 214, depending on the command message, comprises between 0 to 33 cycles of 16 bit data words. In accordance with a preferred embodiment of the present invention, command messages signal the commencement or end of a data packet. When not transmitting a command message, command bit 212 transmits an idle signal.

Referring now to FIG. 6C, signals are constantly being transferred over links 14, either in the form of commands, idle signals, link messages, or data packets. The timing signal rises to high with the initialization of a command bit 212, remains at high for the duration of an idle message, sinks from the high signal at the commencement of a link message/data packet and remains at low throughout the duration of the link message/data packet. Hence, the rising or sinking state of the command bit indicates whether to anticipate commands or to anticipate message/data.

Referring now to FIG. 7, an exemplary protocol for data packet 214 is shown which comprises 16 bits; bit 15 is a link message bit 220, bits 14–11 provide high address bits 222, bits 10–6 indicate a device number 224, and bits 5–0 indicate a message type 226.

As noted hereinabove, the link message bit 220 is either set or not set, and is used to signify either a local link message or a switch link message, respectively. The high address 222 is provided for PCI address mapping and used for communication between switches 12 and PCIs connected to the network. The device number 224 identifies the number of the device designated to receive the link message and/or data packet. The message type 226, as described in U.S. patent application Ser. No. 08/790,155, which is incorporated herein by reference, relays messaging protocol between switches 12.

What is claimed is:

1. A data network comprising:
   at least one crossbar, wherein each crossbar comprises N ports;
   a plurality N of devices each associated with and connected to one port of one of said crossbars;
   wherein each one port of one crossbar comprises:
      an input buffer for receiving messages from the device connected to its port and for sending said messages to the N−1 other ports of said one crossbar;
      a plurality N−1 of port output buffers, each corresponding to one of said N−1 other ports, wherein each of said plurality of N−1 of port output buffers receives said messages only from a corresponding input buffer corresponding to one of said N−1 other ports;
      a plurality N−1 of fullness sensors, each associated with one port output buffer, for measuring the fullness state of its associated port output buffer;
   shutoff means, connected to the fullness sensors associated with the port output buffers corresponding to said one port at said N−1 other ports, for, when said fullness state for one of said other ports is generally full, indicating to said device connected to said one port not to send data for the port which is now generally full.

2. A data network comprising:
   at least one crossbar, wherein each crossbar comprises N ports;
   a plurality N of devices each associated with and connected to one port of one of said crossbars;
   wherein each one port of one crossbar comprises:
      an input buffer for receiving messages from the device connected to its port and for sending said messages to the N−1 other ports of said one crossbar;
      a plurality N−1 of port output buffers, each corresponding to one of said N−1 other ports, wherein each of said plurality of N−1 of port output buffers receives said messages only from a corresponding input buffer corresponding to one of said N−1 other ports;
      a plurality N−1 of fullness sensors, each associated with one port output buffer, for measuring the fullness state of its associated port output buffer;
      shutoff means, connected to the fullness sensors associated with the port output buffers corresponding to said one port at said N−1 other ports, for, when said fullness state for one of said other ports is generally full, indicating to said device connected to said one port not to send data for the port which is now generally full,
   wherein each device additionally comprises N−1 device output buffers, one per the N−1 other ports of said crossbar.

3. A network according to claim 2 and wherein each device also comprises a multiplicity of direct memory access (DMA) units for removing data from at least one of said device output buffers.

4. A network according to claim 1 and wherein each crossbar comprises an arbiter for providing said messages from said N−1 port output buffers to said device connected to its port only if said device is not full.

5. A network according to any of the preceding claims 1–4, and wherein each port comprises a bus link connected to said corresponding associated device.

6. A crossbar for communicating with at least one device, said crossbar comprising:
   N ports, each one of said N ports comprising:
      a link logic unit to receive messages and data from a respective device,
      an input buffer to store data from the respective device, N−1 output buffers each corresponding to another one of said N−1 ports; and a port arbiter to select one of said N−1 output buffers to output data to the respective device, wherein said input buffer transfers the stored data to the corresponding output buffer of a selected one of the other one of said N ports.

7. A crossbar according to claim 6, wherein said link logic unit determines a type of message from the respective device.

8. A crossbar according to claim 7, wherein if the type of message is a local link message, a port function is performed and the message is not transferred.

9. A crossbar according to claim 7, wherein if the type of message is a switch link message, the message and the data are transferred.

10. A crossbar according to claim 6, wherein said device comprises one of a switch and a second crossbar.

11. A crossbar according to claim 10, wherein said N−1 output buffers comprises a device table register to store a device number if the device comprises the switch.

12. A crossbar according to claim 10, wherein said N−1 output buffers comprises a device table register to store device numbers of devices connected to the second crossbar.

13. A crossbar according to claim 6,
wherein if the device is unable to receive data, the device provides a message to said link logic unit, and
wherein said link logic unit signals said arbiter to inhibit communication to the device.

14. A crossbar according to claim 6,
wherein if an $n^{th}$ one of said of said N−1 output buffers is at least a predetermined capacity, a signal is sent to the $n^{th}$ one of said port arbiter of the other one of said N−1 ports to inhibit further transmission.

15. A network switch in communication with one port of a crossbar having N ports, said network switch comprising:
N−1 output buffers, each corresponding to N−1 other ports of the N ports of the crossbar, each of said N−1 output buffers comprising:
a direct memory access unit, and
a FIFO; and
an arbiter for controlling communications between said N−1 output buffers and the crossbar,
wherein when the crossbar signals said arbiter to inhibit sending data to an $n^{th}$ one of the N−1 other ports, an $n^{th}$ direct memory access unit stops transferring data from an $n^{th}$ FIFO while other ones of said N−1 direct memory access units are not inhibited from transferring data.

16. A network apparatus comprising:
a crossbar for communicating with at least one device, said crossbar comprising:
N ports, each one of said N ports comprising:
a link logic unit to receive messages and said data from a respective device,
an input buffer to store data from the respective device,
N−1 output buffers each corresponding to another one of said N−1 ports; and
a port arbiter to select one of said N−1 output buffers to output data to the respective device,
wherein said input buffer transfers the stored data to the corresponding output buffer of a selected one of the other one of said N ports,
wherein said at least one device comprises:
a network switch in communication with an $m^{th}$ port of said crossbar, said network switch comprising:
N−1 output buffers, each corresponding to N−1 other ports of the N ports of said crossbar, each of said N−1 output buffers comprising:
a direct memory access unit, and
a FIFO; and
an arbiter in communication with said port arbitor for controlling communications between said N−1 output buffers and the crossbar,
wherein when said crossbar signals said arbiter to inhibit sending data to an $n^{th}$ one of said N−1 other ports, an $n^{th}$ direct memory access unit stops transferring data from an $n^{th}$ FIFO while other ones of said N−1 direct memory access units are not inhibited from transferring data.

17. A crossbar for communicating with at least one device, said crossbar comprising:
N ports means, each one of said N port means comprising:
link logic means for receiving messages and data from a respective device,
input buffers means for storing data from the respective device,
N−1 output buffers means each corresponding to another one of said N−1 port means; and
port arbiter means for selecting one of said N−1 output buffer means for outputting data to the respective device,
wherein said input buffer means transfers the stored data to the corresponding output buffer means of a selected one of the other one of said N port means.

18. A crossbar according to claim 17, wherein said link logic means determines a type of message from the respective device.

19. A crossbar according to claim 18, wherein if the type of message is a local ink message, a port function is performed and the message is not transferred.

20. A crossbar according to claim 18, wherein if the type of message is a switch link message, the message and the data are transferred.

21. A crossbar according to claim 17, wherein said device comprises one of a switch and a second crossbar.

22. A crossbar according to claim 21, wherein said N−1 output buffer means comprises a device table register means for storing a device number if the device comprises the switch.

23. A crossbar according to claim 21, wherein said N−1 output buffer means comprises a device table register means for storing device numbers of devices connected to the second crossbar.

24. A crossbar according to claim 17,
wherein if the device is unable to receive data, the device provides a message to said link logic means, and
wherein said link logic means signals said arbiter means to inhibit communication to the device.

25. A crossbar according to claim 17,
wherein if an $n^{th}$ one of said of said N−1 output buffer means is at least a predetermined capacity, a signal is sent to the $n^{th}$ one of said port arbiter means of the other one of said N−1 port means to inhibit further transmission.

26. A network switch in communication with one port of a crossbar having N port means, said network switch comprising:
N−1 output buffer means, each corresponding to N−1 other port means of the N port means of the crossbar, each of said N−1 output buffer means comprising:
direct memory access means for controlling memory access, and
FIFO buffer means for storing data; and
arbiter means for controlling communications between said N−1 output buffer means and the crossbar, wherein when the crossbar signals said arbiter means to inhibit sending data to an $n^{th}$ one of the N−1 other port means, an $n^{th}$ direct memory access means stops transferring data from an $n^{th}$ FIFO buffer means while other ones of said N−1 direct memory access means are not inhibited from transferring data.

27. A network apparatus comprising:

crossbar means for communicating with at least one device, said crossbar means comprising:
- N port means, each one of said N port means comprising:
  - link logic means for receiving messages and data from a respective device,
  - input buffer means for storing data from the respective device,
  - N−1 output buffer means each corresponding to another one of said N−1 port means; and
  - port arbiter means for selecting one of said N−1 output buffer means to output data to the respective device,
  - wherein said input buffer means transfers the stored data to the corresponding output buffer means of a selected one of the other one of said N port means, wherein said at least one device comprises:
- network switch means for communicating with an $m^{th}$ port of said crossbar, said network switch means comprising:
  - N−1 output buffer means, each corresponding to N−1 other port means of the N port means of said crossbar means, each of said N−1 output buffer means comprising:
    - direct memory access means, and
    - FIFO buffer means; and
  - arbiter means in communication with said port arbitor for controlling communications between said N−1 output buffer means and the crossbar, wherein when said crossbar signals said arbiter means to inhibit sending data to an $n^{th}$ one of said N−1 other port means, an $n^{th}$ direct memory access means stops transferring data from an $n^{th}$ FIFO BUFFER MEANS while other ones of said N−1 direct memory access means are not inhibited from transferring data.

* * * * *